(12) United States Patent
Imada

(10) Patent No.: US 9,403,979 B2
(45) Date of Patent: Aug. 2, 2016

(54) RESIN COMPOSITION AND RESIN MOLDED ARTICLE

(71) Applicant: FUJI XEROX CO., LTD., Tokyo (JP)

(72) Inventor: Akira Imada, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/627,468

(22) Filed: Feb. 20, 2015

(65) Prior Publication Data

US 2016/0017142 A1 Jan. 21, 2016

(30) Foreign Application Priority Data

Jul. 15, 2014 (JP) ................................. 2014-145283

(51) Int. Cl.
  *C08L 69/00* (2006.01)
  *C08L 33/14* (2006.01)
  *C08L 67/00* (2006.01)
(52) U.S. Cl.
  CPC *C08L 69/00* (2013.01); *C08L 33/14* (2013.01)
(58) Field of Classification Search
  None
  See application file for complete search history.

(56) References Cited

U.S. PATENT DOCUMENTS

| 6,248,820 | B1 * | 6/2001 | Nozaki | C08K 3/32 252/606 |
| 6,538,054 | B1 * | 3/2003 | Klatt | C08K 5/0066 524/101 |
| 2001/0012865 | A1 | 8/2001 | Matsumoto et al. | |

FOREIGN PATENT DOCUMENTS

| CN | 101659779 | * | 3/2010 |
| JP | 3454515 B2 | | 10/2003 |

OTHER PUBLICATIONS

Machine translation of CN 101659779.*

* cited by examiner

*Primary Examiner* — Ana Woodward
(74) *Attorney, Agent, or Firm* — Oliff PLC

(57) ABSTRACT

A resin composition includes a polycarbonate resin, an aromatic polyester resin, a glycidyl group-containing polyethylene copolymer, and red phosphorus of which particle surfaces are covered with at least one of a thermosetting resin and an inorganic substance, and a volume average particle diameter is 15 μm or less.

11 Claims, No Drawings

RESIN COMPOSITION AND RESIN MOLDED ARTICLE

CROSS-REFERENCE TO RELATED APPLICATIONS

This application is based on and claims priority under 35 USC 119 from Japanese Patent Application No. 2014-145283 filed Jul. 15, 2014.

BACKGROUND

1. Technical Field

The present invention relates to a resin composition and a resin molded article.

2. Related Art

In the related art, various resin compositions are provided to be used in various ways. For example, the resin compositions are used in resin molded articles such as various housings and components of home appliances or automobiles, or used in resin molded articles such as housings of business machines and electronic and electric apparatuses.

A polycarbonate resin is a thermoplastic resin having excellent impact resistance, heat resistance, and the like, and is widely used as a resin molded article such as a component and a housing in the field of machines, automobiles, electric equipment, and electronic equipment, and the like. Furthermore, since the polyester resin is a resin exhibiting good molding fluidity, an aromatic polyester resin may be blended with the polycarbonate resin to be used. In order to enhanced mechanical characteristics and heat resistance of the resin molded article obtained from the resin composition containing the polycarbonate resin and the aromatic polyester resin, a resin composition obtained by blending a filler with the polycarbonate resin and the aromatic polyester resin are being considered.

SUMMARY

According to an aspect of the invention, there is provided a resin composition including:

a polycarbonate resin;
an aromatic polyester resin;
a glycidyl group-containing polyethylene copolymer; and
red phosphorus of which particle surfaces are covered with at least one of a thermosetting resin and an inorganic substance, and a volume average particle diameter is 15 μm or less.

DETAILED DESCRIPTION

Exemplary embodiments of the invention are described below. The exemplary embodiments are described as an example for carrying out the invention, and the invention is not limited thereto.

Resin Composition

A resin composition according to the exemplary embodiment includes a polycarbonate resin, an aromatic polyester resin, a glycidyl group-containing polyethylene copolymer, and red phosphorus of which particle surfaces are covered with at least one of a thermosetting resin and an inorganic substance and the volume average particle diameter is 15 μm or less.

As in the resin composition according to the exemplary embodiment, it is considered that it is possible to cause the polycarbonate resin and the aromatic polyester resin to have a high molecular weight by blending the glycidyl group-containing polyethylene copolymer with the composition containing the polycarbonate resin, the aromatic polyester resin, and the red phosphorus of which the particle surfaces are covered with at least one of the thermosetting resin and the inorganic substance and the volume average particle diameter is 15 μm or less so that a terminal group of the polycarbonate resin or the aromatic polyester resin and a glycidyl group of the glycidyl group-containing polyethylene copolymer react with each other. Also, it is considered that the polyethylene copolymer functions as a thermoplastic elastomer that is softened by heating to exhibit fluidity and returns to a rubbery elastic member by cooling. It is considered that when a resin molded article is obtained with the resin composition containing the polycarbonate resin or the aromatic polyester resin which are modified by the glycidyl group-containing polyethylene copolymer as described above (for example, which are caused to have a high molecular weight), the polycarbonate resin and the aromatic polyester resin are prevented from being stretched into a fiber shape to become oriented. Therefore, it is presumed that crazes or cracks generated in the resin molded articles when mechanical stress is applied to the resin molded article are prevented from being developed in an orientation direction. Further, it is considered that the red phosphorus of which the particle surfaces are covered with at least one of the thermosetting resin and the inorganic substance mainly has a function of imparting heat resistance to the resin molded article. However, it is presumed that if the volume average particle diameter of the red phosphorus particles is 15 μm or less, the red phosphorus is prevented from becoming a starting point of a craze or a crack which may be generated in the resin molded article when the mechanical stress is applied to the resin molded article. Therefore, it is considered that the resin composition according to the exemplary embodiment containing the polycarbonate resin, the aromatic polyester resin, the glycidyl group-containing polyethylene copolymer, and the red phosphorus of which the particle surfaces are covered with at least one of the thermosetting resin and the inorganic substance, and the volume average particle diameter is 15 μm or less has enhanced impact resistance and tensile elongation at break of the obtainable resin molded article compared with the resin composition composed of the polycarbonate resin, the aromatic polyester resin, and the red phosphorus (particularly, the red phosphorus of which the volume average particle diameter is greater than 15 μm).

Hereinafter, respective components of the resin composition according to the exemplary embodiment are described.

Polycarbonate Resin

Examples of the polycarbonate resin used in the exemplary embodiment include a resin having (—O—R—OCO—) as a repeating unit. In addition, examples of R include diphenylpropane and p-xylene. —O—R—O is not particularly limited as long as it is a dioxy compound. Specific examples of the polycarbonate resin include aromatic polycarbonate such as bisphenol A-type, Z-type, S-type, MIBK-type, AP-type, TP-type, biphenyl-type, and bisphenol A water addition-type polycarbonate.

For example, the polycarbonate resin used in the exemplary embodiment is prepared by reaction of dihydric phenol and a carbonate precursor.

Examples of the dihydric phenol include 2,2-bis(4-hydroxyphenyl) propane [bisphenol A], bis(4-hydroxyphenyl) methane, 1,1-bis(4-hydroxyphenyl) ethane, 2,2-bis(4-hydroxy-3,5-dimethylphenyl) propane, bis(4-hydroxyphenyl) cycloalkane, bis(4-hydroxyphenyl) oxide, bis(4-hydroxyphenyl) sulfide, bis(4-hydroxyphenyl)sulfone, bis(4-hydroxyphenyl)sulfoxide, bis(4-hydroxyphenyl) ether, and bis(4-hydroxyphenyl) ketone.

Examples of the carbonate precursor include carbonyl halide, carbonyl ester, and haloformates. Specific examples include phosgene, dihaloformates of a dihydric phenol, diphenyl carbonate, dimethyl carbonate, and diethyl carbonate.

The weight average molecular weight of the polycarbonate resin is preferably in a range of 5,000 to 30,000, and more preferably in a range of 10,000 to 25,000. If the weight average molecular weight of the polycarbonate resin is less than 5,000, fluidity of the resin composition may increase to deteriorate workability compared with the case in which the scope is satisfied, and if the weight average molecular weight of the polycarbonate resin is greater than 30,000, fluidity of the resin composition may decrease to deteriorate workability compared with the case in which the scope is satisfied.

The weight average molecular weight is measured by gel permeation chromatography (GPC). The molecular weight measurement by GPC is performed in a chloroform solvent by using HLC-8320 GPC manufactured by Tosoh Corporation as a measuring apparatus with column TSKgel GMHHR-M+TSKgel GMHHR-M (7.8 mm I.D.×30 cm) manufactured by Tosoh Corporation. The weight average molecular weight is calculated by using a molecular weight calibration curve manufactured with a monodispersed polystyrene standard sample from measurement results thereof. The measurement of the weight average molecular weight is performed as follows.

The content of the polycarbonate resin is preferably in a range of 50% by weight to 95% by weight and more preferably in a range of 55% by weight to 90% by weight with respect to the total amount of the resin composition. If the content of the polycarbonate resin is less than 50% by weight with respect to the total amount of the resin composition, impact resistance of the obtainable resin molded article may be deteriorated compared with the case in which the scope is satisfied, and if the content is greater than 95% by weight, mold fluidity of the resin may be deteriorate.

Aromatic Polyester Resin

The aromatic polyester resin used in the exemplary embodiment is the polyester having an aromatic ring included in a chain unit of a polymer, and examples thereof include a polymer or a copolymer obtained by polycondensation reaction of aromatic dicarboxylic acid and diol (and ester-forming derivatives thereof) which are used as main components.

Examples of the aromatic dicarboxylic acid include phthalic acid, terephthalic acid, isophthalic acid, orthophthalic acid, 1,5-naphthalene dicarboxylic acid, biphenyl-2,2'-dicarboxylic acid, diphenyl sulfone-4,4'-dicarboxylic acid, anthracene-2,5-dicarboxylic acid, p-terphenylene-4,4'-dicarboxylic acid, and pyridine-2,5-dicarboxylic acid.

Examples of the diol component include aliphatic glycol, polyoxyalkylene glycol, alicyclic diol, and aromatic diol. Examples of the aliphatic glycol include aliphatic glycol having 2 to 12 carbon atoms such as ethyleneglycol and trimethylene glycol. The polyoxyalkylene glycol may be glycol which contains an alkylene group having 2 to 4 carbon atoms and plural oxyalkylene units, and examples of the polyoxyalkylene glycol include diethyleneglycol and dipropyleneglycol. Examples of the alicyclic diol include 1,4-cyclohexanediol and 1,4-cyclohexanedimethylol. Examples of the aromatic diol include 2,2-bis-(4-(2-hydroxyethoxy)phenyl) propane and xyleneglycol.

Specific examples of the aromatic polyester resin used in the exemplary embodiment include polyethylene terephthalate (PET), polypropylene terephthalate, polybutylene terephthalate, polyethylene naphthalate, polybutylene naphthalate, polyethylene-1,2-bis(phenoxy) ethane-4,4'-dicarboxylate, and polycyclohexylenedimethylene terephthalate. Among these, in view of fluidity of the resin composition, polyethylene terephthalate (PET) is preferable.

For example, the weight average molecular weight of the aromatic polyester resin is preferably in a range of 5,000 to 100,000, and more preferably in a range of 10,000 to 50,000. If the weight average molecular weight of the aromatic polyester resin is less than 5,000, fluidity of the resin composition may increase to deteriorate workability compared with the case in which the scope is satisfied, and if the weight average molecular weight of the aromatic polyester resin is greater than 100,000, fluidity of the resin composition may decrease to deteriorate workability compared with the case in which the scope is satisfied.

The content of the aromatic polyester resin is preferably in a range of 5% by weight to 50% by weight, and more preferably in a range of 10% by weight to 45% by weight with respect to the total amount of the resin composition. If the content of the aromatic polyester resin is less than 5% by weight with respect to the total amount of the resin composition, chemical resistance of the obtainable resin molded article may be deteriorated compared with the case in which the scope is satisfied, and if the content is greater than 50% by weight, heat resistance of the obtainable resin molded article may be deteriorated.

Glycidyl Group-Containing Polyethylene Resin

The glycidyl group-containing polyethylene copolymer used in the exemplary embodiment is a copolymer of an ethylene monomer unit and a glycidyl group-containing (meth)acrylic acid ester monomer unit. Examples of the glycidyl group-containing (meth)acrylic acid ester monomer unit include constituent units derived from monomers such as glycidyl(meth)acrylate, vinyl glycidyl ether, (meth)acryl glycidyl ether, 2-methyl propenyl glycidyl ether, styrene-p-glycidyl ether, glycidyl cinnamate, itaconic acid glycidyl ester, and N-[4-(2,3-epoxypropoxy)-3,5-dimethylbenzyl]methacrylamide. Among these, since a polyethylene copolymer having a glass transition temperature of 0° C. or lower may be obtained, glycidyl(meth)acrylate is preferable. In addition, "(meth)acryl" means acryl or methacryl.

The glycidyl group-containing polyethylene copolymer is preferably a polyethylene copolymer which is composed of an ethylene monomer unit and a glycidyl group-containing (meth)acrylic acid ester monomer unit and in which the content of the glycidyl group-containing (meth)acrylic acid ester monomer unit in the glycidyl group-containing polyethylene copolymer is in a range of 2% by weight to 20% by weight and the glass transition temperature is 0° C. or less, or a copolymer obtained by graft-polymerizing a vinyl monomer to a main chain of a polyethylene copolymer composed of an ethylene monomer unit and a glycidyl group-containing (meth)acrylic acid ester monomer unit. It is considered that the glycidyl group-containing polyethylene copolymer as described above has more enhanced impact resistance and more enhanced tensile elongation at break of the obtainable resin molded article compared with a polyethylene copolymer which is composed of an ethylene monomer unit and a glycidyl group-containing (meth)acrylic acid ester monomer unit and in which the content of the glycidyl group-containing (meth)acrylic acid ester monomer unit in the glycidyl group-containing polyethylene copolymer is less than 2% by weight or greater than 20% by weight. In addition, it is considered that if the content of the glycidyl group-containing (meth) acrylic acid ester monomer unit in the glycidyl group-containing polyethylene copolymer is less than 2% by weight, the polycarbonate resin or the polyester resin may not be caused to have a high molecular weight compared with the scope is satisfied, and if the content is greater than 20% by weight, fluidity of the resin composition is lowered compared with the scope is satisfied. In addition, it is considered that if the glass transition temperature is greater than 0° C., elasticity of the obtainable resin molded article is lowered compared with the case in which the glass transition temperature is 0° C. or less.

The glass transition temperature of the polyethylene copolymer means a glass transition temperature measured as follows. That is, a calorie spectrum is measured in a condition of temperature rising speed of 10° C. per minute with a differential calorimeter device (differential scanning calorimeter device DSC-60 manufactured by Shimadzu Corporation), an intermediate value (Tgm) of two shoulder values obtained by a tangent line method from peaks derived from glass transition is set to be a glass transition temperature.

A method of preparing a glycidyl group-containing polyethylene copolymer may be a method of living-polymerizing monomers which constitutes an ethylene monomer unit and a glycidyl group-containing (meth)acrylic acid ester monomer unit respectively. Examples of the living polymerization include a method of anionic polymerization performed by using an organic alkali metal compound as a polymerization initiator in the presence of mineral acid salts such as salts of alkali metal or alkali earth metal, a method of anionic polymerization performed by using an organic alkali metal compound as a polymerization initiator in the presence of an organic aluminum compound, a method of polymerization performed by using an organic rare earth metal complex as a polymerization initiator, and a method of radical polymerization performed by using α-halogenated ester compound as an initiator in the presence of a copper compound.

In addition, a method of preparing a copolymer obtained by graft-polymerizing a vinyl monomer to a main chain of the polyethylene copolymer may be a method of adding a vinyl monomer to the polyethylene copolymer, and polymerizing the vinyl monomer and the polyethylene copolymer in a single step or multiple steps by radical polymerization.

Examples of the vinyl monomer include an ester vinyl monomer unit, an aromatic vinyl monomer unit, and a vinyl cyanide monomer unit. Examples of the ester vinyl monomer unit include methyl(meth)acrylate, ethyl(meth)acrylate, butyl(meth)acrylate, isobutyl(meth)acrylate, and 2-ethylhexyl(meth)acrylate. Examples of the aromatic vinyl monomer include styrene and vinylnaphthalene. Examples of the vinyl cyanide monomer include acrylonitrile, α-chloroacrylonitrile, and methacrylonitrile.

For example, the weight average molecular weight of the glycidyl group-containing polyethylene copolymer is preferably in a range of 3,000 to 100,000, and more preferably in a range of 5,000 to 50,000. If the weight average molecular weight of the glycidyl group-containing polyethylene copolymer is less than 3,000, impact resistance may be deteriorated compared with the case in which the scope is satisfied, and if the weight average molecular weight of the glycidyl group-containing polyethylene copolymer is greater than 100,000, dispersibility to a resin may be deteriorated compared with the case in which the scope is satisfied.

The content of the glycidyl group-containing polyethylene copolymer is preferably in a range of 1% by weight to 10% by weight, and more preferably in a range of 2% by weight to 8% by weight with respect to 100 parts by weight of the total amount of the polycarbonate resin and the aromatic polyester resin. If the content of the glycidyl group-containing polyethylene copolymer is in a range of 1% by weight to 10% by weight, it is considered that impact resistance and tensile elongation at break of the obtainable resin molded article is further enhanced compared with a case in which the content is less than 1% by weight or greater than 10% by weight.

Red Phosphorus

The red phosphorus used in the exemplary embodiment is red phosphorus of which the particle surfaces are covered with at least one of the thermosetting resin and the inorganic substance, and the volume average particle diameter is 15 µm or less (hereinafter, also referred to as stabilized red phosphorus). Examples of the resin that covers the particle surfaces of the red phosphorus include phenol resin, melamine resin, epoxy resin, unsaturated polyester resin, phenol-formalin resin, urea-formalin resin, melamine-formalin resin, and furfuryl alcohol-formalin resin. Among these, in view of compatibility with the polycarbonate resin or the aromatic polyester resin, the phenol resin is preferable. In addition, examples of the inorganic substance that covers the particle surfaces of the red phosphorus include oxide or hydroxide containing an element selected from Zn, Al, Mg, Ti, Si, Co, Zr, and Sn, and these inorganic substances may be hydrated compound or anhydride.

In addition, in view of stability of red phosphorus, and compatibility with the polycarbonate resin or the aromatic polyester resin, the stabilized red phosphorus is more preferably stabilized red phosphorus obtained by covering particle surfaces of the red phosphorus with oxide or hydroxide containing an element selected from Zn, Al, Mg, Ti, Si, Co, Zr, and Sn, and then covering the particle surfaces with a phenol resin.

As described above, in view of impact resistance and tensile elongation at break of the obtainable resin molded article, the volume average particle diameter of the stabilized red phosphorus used in the exemplary embodiment is not particularly limited as long as the volume average particle diameter is 15 µm or less, but preferably in a range of 5 µm to 15 µm, and more preferably in a range of 5 µm to 10 µm. In addition, if the volume average particle diameter of the stabilized red phosphorus is less than 5 µm, the dispersibility may be deteriorated.

The volume average particle diameter of the stabilized red phosphorus is measured by a laser diffraction-type particle size distribution measuring apparatus (LA-700 manufactured by Horiba Ltd.). As a measurement method, a sample in a state of dispersion is adjusted so that a solid content becomes approximately 2 g, and ion-exchanged water is added to the sample so that a total amount becomes approximately 40 mL. This is put into a cell until concentration becomes proper, and after approximately 2 minutes, when concentration in the cell is substantially stabilized, the volume average particle diameter is measured. The obtained volume average particle diameters for each channel are accumulated in an ascending order of the volume average particle diameters, and the volume average particle diameter when the accumulation becomes 50% is set to be the volume average particle diameter according to the exemplary embodiment.

The content of the stabilized red phosphorus is preferably in a range of 1% by weight to 10% by weight, and more preferably in a range of 2% by weight to 8% by weight with respect to 100 parts by weight of the total amount of the polycarbonate resin and the aromatic polyester resin. When the content of the stabilized red phosphorus is in a range of 1% by weight to 10% by weight, it is considered that the impact resistance and tensile elongation at break of the obtainable resin molded article are enhanced compared with a case in which the content is less than 1% by weight or greater than 10% by weight.

The method of preparing the stabilized red phosphorus is not particularly limited, but, for example, may be a method of adding a water-soluble metal salt and an alkali agent to a slurry in which red phosphorus particles are dispersed in water to cover red phosphorus particle surfaces with inorganic substances of hydroxide or oxide of metal, adding a synthetic raw material of a thermosetting resin to the slurry in which red phosphorus particles covered with the inorganic substance are dispersed in water, and performing polymerization reaction to thereby cover the red phosphorus particle surface covered with the inorganic substance, with the thermosetting resin.

Other Component

The resin composition according to the exemplary embodiment may contain other components as long as it does not deteriorate impact resistance and tensile elongation at break of the obtainable resin molded article. Examples of the other components include a hydrolysis preventing agent, an antioxidant, and a drip preventing agent.

Examples of the hydrolysis preventing agent include a carbodiimide compound and an oxazoline compound. Examples of the carbodiimide compound include dicyclohexyl carbodiimide, diisopropyl carbodiimide, dimethyl carbodiimide, diisobutyl carbodiimide, dioctyl carbodiimide, diphenyl carbodiimide, and naphthyl carbodiimide.

Examples of the antioxidant include a phenol antioxidant, an amine antioxidant, a phosphorous antioxidant, a sulfur antioxidant, a hydroquinone antioxidant, or a quinoline antioxidant.

Examples of the drip preventing agent include polytetrafluoroethylene (PTFE).

Resin Molded Article

The resin molded article according to the exemplary embodiment is configured with the resin composition according to the exemplary embodiment described above. For example, the resin molded article according to the exemplary embodiment may be obtained by molding the resin composition according to the exemplary embodiment described above, for example, using molding methods such as injection molding, extrusion molding, blow molding, hot press molding. According to the exemplary embodiment, in view of dispersibility of the respective components in the resin molded article, it is preferable that the resin molded article is obtained by injection-molding the resin composition according to the exemplary embodiment.

The injection molding may be performed by using commercially available apparatus such as "NEX150" manufactured by Nissei Plastic Industrial Co., Ltd., "NEX70000" manufactured by Nissei Plastic Industrial Co., Ltd., and "NEX500" manufactured by Nissei Plastic Industrial Co., Ltd. At this point, in view of resin melting, a cylinder temperature is preferably in a range of 170° C. to 280° C. In addition, in view of productivity, the mold temperature is preferably in a range of 30° C. to 120° C.

The resin molded article according to the exemplary embodiment is appropriately used for electronic and electrical apparatuses, home appliances, containers, and interior materials for automobiles. More specifically, examples of the usage include housings, various components, or the like of home appliances or electronic and electrical apparatuses, wrapping films, storage cases of CD-ROM, DVD, or the like, tableware, food tray, drink bottle, medicine wrapping materials. Among these, the resin molded article according to the exemplary embodiment is preferably used for components of electronic and electrical apparatuses. Specifically, the components of electronic and electrical apparatuses require high impact resistance and tensile elongation at break. Also, it is possible to obtain the resin molded article having excellent impact resistance and excellent tensile elongation at break by using the resin composition containing the polycarbonate resin, the aromatic polyester resin, the glycidyl group-containing polyethylene copolymer, and the red phosphorus of which particle surfaces are covered with at least one of the thermosetting resin and the inorganic substance and the volume average particle diameter is 15 μm or less.

EXAMPLE

Hereinafter, the invention is more specifically described with reference to examples and comparative examples. However, the invention is not limited the examples below.

Glycidyl Group-Containing Polyethylene Copolymer A-1

A glycidyl group-containing polyethylene copolymer A-1 is "AX8900" manufactured by ARKEMA, which is an ethylene/glycidyl methacrylate/methyl acrylate copolymer. The composition ratio of ethylene/glycidyl methacrylate/methyl acrylate is 68/8/24 (% by weight). A glass transition temperature (Tg) of the ethylene/glycidyl methacrylate/methyl acrylate copolymer is −33° C.

Glycidyl Group-Containing Polyethylene Copolymer A-2

A glycidyl group-containing polyethylene copolymer A-2 is "Bond Fast 7L" manufactured by Sumimoto Chemical Co., Ltd., which is an ethylene/glycidyl methacrylate/methyl acrylate copolymer. The composition ratio of ethylene/glycidyl methacrylate/methyl acrylate is 70/3/27 (% by weight). A glass transition temperature (Tg) of the ethylene/glycidyl methacrylate/methyl acrylate copolymer is −33° C.

Glycidyl Group-Containing Polyethylene Copolymer A-3

A glycidyl group-containing polyethylene copolymer A-3 is "CG5001" manufactured by Sumimoto Chemical Co., Ltd., which is an ethylene/glycidyl methacrylate copolymer. The composition ratio of ethylene/glycidyl methacrylate is 81/19 (% by weight). A glass transition temperature (Tg) of the ethylene/glycidyl methacrylate copolymer is −38° C.

Glycidyl Group-Containing Polyethylene Copolymer A-4

A glycidyl group-containing polyethylene copolymer A-4 is "Modiper A4300" manufactured by NOF Corporation, which is a copolymer obtained by graft-polymerizing butyl acrylate and methyl methacrylate as a vinyl monomer with a main chain of an ethylene/glycidyl methacrylate copolymer. The composition ratio of the ethylene/glycidyl methacrylate/butyl acrylate/methyl methacrylate is 61/9/21/9 (% by weight). A glass transition temperature (Tg) of the ethylene/glycidyl methacrylate copolymer is −45° C.

Glycidyl Group-Containing Polyethylene Copolymer A-5

A glycidyl group-containing polyethylene copolymer A-5 is "Modiper A4400" manufactured by NOF Corporation, which is a copolymer obtained by graft-polymerizing acrylonitrile and styrene as a vinyl monomer with a main chain of an ethylene/glycidyl methacrylate copolymer. The composition ratio of ethylene/glycidyl methacrylate/acrylonitrile/styrene is 43/8/15/35 (% by weight). A glass transition temperature (Tg) of the ethylene/glycidyl methacrylate copolymer is −42° C.

Glycidyl Group-Containing Polyethylene Copolymer A-6

The glycidyl group-containing polyethylene copolymer A-6 is "Modiper A4200" manufactured by NOF Corporation, which is a copolymer obtained by graft-polymerizing methyl methacrylate as a vinyl monomer with a main chain of an ethylene/glycidyl methacrylate copolymer. The composition ratio of ethylene/glycidyl methacrylate/methyl methacrylate is 60/10/30 (% by weight). A glass transition temperature (Tg) of the ethylene/glycidyl methacrylate copolymer is −43° C.

Glycidyl Group-Containing Polyethylene Copolymer A-7

25 parts by weight of glycidyl methacrylate, and 0.5 parts by weight of dialkyl peroxide (Product name: Perhexa 25B manufactured by NOF Corporation) are evenly mixed with 75 parts by weight of polyethylene (Product name: Niporon-Z 1P53A manufactured by Tosoh Corporation) in Henschel mixer. Thereafter, the resultant is extruded at a cylinder temperature of 220° C. with a twin screw extruder (Product name: TEM-35 manufactured by Toshiba Machine Co., Ltd.) to obtain an ethylene/glycidyl methacrylate copolymer (composition ratio of ethylene/glycidyl methacrylate=75/25 (% by weight)). A glass transition temperature (Tg) of the ethylene/glycidyl methacrylate copolymer is −32° C. This is set to be a glycidyl group-containing polyethylene copolymer A-7.

Glycidyl Group-Containing Polyethylene Copolymer A-8

20 parts by weight of glycidyl methacrylate, 80 parts by weight of polyethylene, and 0.5 parts by weight of dialkyl peroxide are extruded in the same condition as the copolymer A-7 to obtain an ethylene/glycidyl methacrylate copolymer (composition ratio of ethylene/glycidyl methacrylate=80/20 (% by weight)). A glass transition temperature (Tg) of the ethylene/glycidyl methacrylate copolymer is −36° C. This is set to be a glycidyl group-containing polyethylene copolymer A-8.

Glycidyl Group-Containing Polyethylene Copolymer A-9

2 parts by weight of glycidyl methacrylate, 98 parts by weight of polyethylene, and 0.5 parts by weight of dialkyl peroxide are extruded in the same manner as the copolymer A-7 to obtain an ethylene/glycidyl methacrylate copolymer (composition ratio of ethylene/glycidyl methacrylate=98/2 (% by weight)). A glass transition temperature (Tg) of the ethylene/glycidyl methacrylate copolymer is −57° C. This is set to be a glycidyl group-containing polyethylene copolymer A-9.

Glycidyl Group-Containing Polyethylene Copolymer A-10

1 part by weight of glycidyl methacrylate, 99 parts by weight of polyethylene, and 0.5 parts by weight of dialkyl peroxide are extruded in the same manner as the copolymer A-7 to obtain an ethylene/glycidyl methacrylate copolymer (composition ratio of ethylene/glycidyl methacrylate=99/1 (% by weight)). A glass transition temperature (Tg) of the ethylene/glycidyl methacrylate copolymer is −58° C. This is set to be a glycidyl group-containing polyethylene copolymer A-10.

Glycidyl Group-Containing Polyethylene Copolymer A-11

10 parts by weight of glycidyl methacrylate, 60 parts by weight of polyethylene, 30 parts by weight of methyl methacrylate, and 0.5 parts by weight of dialkyl peroxide are extruded in the same manner as the copolymer A-7 to obtain an ethylene/glycidyl methacrylate/methyl methacrylate copolymer (composition ratio of ethylene/glycidyl methacrylate/methyl methacrylate=60/10/30 (% by weight)). A glass transition temperature (Tg) of the ethylene/glycidyl methacrylate copolymer is 7° C. This is set to be a glycidyl group-containing polyethylene copolymer A-11.

Glycidyl Group-Containing Polyethylene Copolymer A-12

8 parts by weight of 4-hydroxybutyl acrylate glycidyl ether, 68 parts by weight of polyethylene, 24 parts by weight of methyl acrylate, and 0.5 parts by weight of dialkyl peroxide are extruded in the same manner as the copolymer A-7 to obtain an ethylene/4-hydroxybutyl acrylate glycidyl ether/methyl acrylate copolymer (composition ratio of ethylene/4-hydroxybutyl acrylate glycidyl ether/methyl acrylate=68/8/4 (% by weight)). A glass transition temperature (Tg) of the ethylene/4-hydroxybutyl acrylate glycidyl ether/methyl acrylate copolymer is −40° C. This is set to be a glycidyl group-containing polyethylene copolymer A-12.

Comparative Polymer B-1

A comparative polymer B-1 is "VC40" manufactured by Sumimoto Chemical Co., Ltd., which is an ethylene homopolymer. A glass transition temperature (Tg) of the ethylene homopolymer is −58° C.

Comparative Polymer B-2

A comparative polymer B-2 is "Modiper A5300" manufactured by NOF Corporation, which is a copolymer obtained by graft-polymerizing butyl acrylate and methyl methacrylate as a vinyl monomer with a main chain of the ethylene/ethyl acrylate copolymer. The composition ratio of ethylene/ethyl acrylate/butyl acrylate/methyl methacrylate is 56/14/21/9 (% by weight). A glass transition temperature (Tg) of the ethylene/ethyl acrylate copolymer is −51° C.

Comparative Polymer B-3

62 parts by weight of ethylene and 38 parts by weight of methyl methacrylate are mixed and polymerized to obtain an ethylene/methyl methacrylate copolymer (composition ratio of ethylene/methyl methacrylate=62/38 (% by weight)). The glass transition temperature (Tg) of the ethylene/methyl methacrylate copolymer is 4° C. This is set to be a comparative polymer B-3.

Compositions of the acrylic copolymers A-1 to A-12 and the comparative polymers B-1 to B-3 are collectively presented in Table 1.

TABLE 1

| | | | Glycidyl group-containing polyethylene copolymer | | | | | | | | | | | | Comparative polymer | | |
|---|---|---|---|---|---|---|---|---|---|---|---|---|---|---|---|---|---|
| | | | A-1 | A-2 | A-3 | A-4 | A-5 | A-6 | A-7 | A-8 | A-9 | A-10 | A-11 | A-12 | B-1 | B-2 | B-3 |
| Constituent components of main chain | Glycidyl group-containing (meth)acrylic acid ester monomer unit | Glycidyl methacrylate | 8 | 3 | 19 | 9 | 8 | 10 | 25 | 20 | 2 | 1 | 10 | | | | |
| | | 4-hydroxybutyl acrylate glycidyl ether | | | | | | | | | | | | 8 | | | |
| | Others | Ethylene | 68 | 70 | 81 | 61 | 43 | 60 | 75 | 80 | 98 | 99 | 60 | 68 | 100 | 56 | 62 |
| | | Methyl methacrylate | | | | | | | | | | | 30 | | | | 38 |
| | | Methyl acrylate | 24 | 27 | | | | | | | | | | 24 | | | |
| | | Ethyl acrylate | | | | | | | | | | | | | | 4 | 14 |

TABLE 1-continued

| | | Glycidyl group-containing polyethylene copolymer | | | | | | | | | | | | Comparative polymer | | |
|---|---|---|---|---|---|---|---|---|---|---|---|---|---|---|---|---|
| | | A-1 | A-2 | A-3 | A-4 | A-5 | A-6 | A-7 | A-8 | A-9 | A-10 | A-11 | A-12 | B-1 | B-2 | B-3 |
| Constituent components of side chain | Butyl acrylate | | | | 21 | | | | | | | | | | | 21 | |
| | Methyl methacrylate | | | | 9 | | 30 | | | | | | | | | 9 | |
| | Acrylonitrile | | | | | 15 | | | | | | | | | | | |
| | Styrene | | | | | 35 | | | | | | | | | | | |
| ° C. (Tg) of main chain | | −33 | −33 | −38 | −45 | −42 | −43 | −32 | −36 | −57 | −58 | 7 | −40 | −58 | −51 | 4 |

Example 1

75 parts by weight of a bisphenol A-type polycarbonate resin (Product name: "L1225L" manufactured by Teijin Limited, viscosity average molecular weight: 22,000) as a polycarbonate resin, 25 parts by weight of polyethylene terephthalate resin (Product name: "J125" manufactured by Mitsui Chemicals, Inc., IV value: 0.77 dl/g) as an aromatic polyester resin, 5 parts by weight of the glycidyl group-containing polyethylene copolymer A-1, 5 parts by weight of stabilized red phosphorus A, 1 part by weight of polytetrafluoroethylene (Product name: "A-3800" manufactured by Mitsubishi Rayon Co., Ltd., PTFE content: 50%) as a drip preventing agent, and 0.3 parts by weight of a phenol resin (Product name: "Irganox 1076" manufactured by BASF SE) as antioxidant are mixed. The stabilized red phosphorus A is Nova Excel 140F manufactured by Rin Kagaku Kogyo Co., Ltd. Specifically, it is stabilized red phosphorus (proportion of red phosphorus: 92%) of which red phosphorus particle surfaces are covered with $Al(OH)_3$, and then are further covered with a phenol resin, and the volume average particle diameter is 5 µm. The mixture is supplied to a blend feeder of a twin screw extruder with a vent (TEX-30α manufactured by The Japan Steel Works, LTD.), and is melted, kneaded, and extruded at a cylinder temperature and a dice temperature in a range of 250° C. to 260° C., at the screw speed of 240 rpm, at a vent absorption degree of 100 MPa, in a discharge amount of 10 kg/h. Also, the resin discharged from the twin screw extruder is cut into pellet shape to obtain pellets.

The obtained pellet-shaped resin composition is dried by using a hot air dryer at 110° C. for 6 hours, and is injection-molded by an injection molding apparatus (Product name: "NEX500" manufactured by Nissei Plastic Industrial Co., Ltd.) in a condition of a cylinder temperature of 260° C. and a mold temperature of 70° C., to obtain a predetermined resin molded article (test sample for evaluation).

Example 2

A predetermined resin molded article (test sample for evaluation) is obtained in the same condition as Example 1 except that the glycidyl group-containing polyethylene copolymer A-2 is used instead of the glycidyl group-containing polyethylene copolymer A-1.

Example 3

A predetermined resin molded article (test sample for evaluation) is obtained in the same condition as Example 1 except that the glycidyl group-containing polyethylene copolymer A-3 is used instead of the glycidyl group-containing polyethylene copolymer A-1.

Example 4

A predetermined resin molded article (test sample for evaluation) is obtained in the same condition as Example 1 except that the glycidyl group-containing polyethylene copolymer A-4 is used instead of the glycidyl group-containing polyethylene copolymer A-1.

Example 5

A predetermined resin molded article (test sample for evaluation) is obtained in the same condition as Example 1 except that the glycidyl group-containing polyethylene copolymer A-5 is used instead of the glycidyl group-containing polyethylene copolymer A-1.

Example 6

A predetermined resin molded article (test sample for evaluation) is obtained in the same condition as Example 1 except that the glycidyl group-containing polyethylene copolymer A-6 is used instead of the glycidyl group-containing polyethylene copolymer A-1.

Example 7

A predetermined resin molded article (test sample for evaluation) is obtained in the same condition as Example 1 except that the glycidyl group-containing polyethylene copolymer A-7 is used instead of the glycidyl group-containing polyethylene copolymer A-1.

Example 8

A predetermined resin molded article (test sample for evaluation) is obtained in the same condition as Example 1 except that the glycidyl group-containing polyethylene copolymer A-8 is used instead of the glycidyl group-containing polyethylene copolymer A-1.

Example 9

A predetermined resin molded article (test sample for evaluation) is obtained in the same condition as Example 1 except that the glycidyl group-containing polyethylene copolymer A-9 is used instead of the glycidyl group-containing polyethylene copolymer A-1.

Example 10

A predetermined resin molded article (test sample for evaluation) is obtained in the same condition as Example 1 except that the glycidyl group-containing polyethylene copolymer A-10 is used instead of the glycidyl group-containing polyethylene copolymer A-1.

Example 11

A predetermined resin molded article (test sample for evaluation) is obtained in the same condition as Example 1 except that the glycidyl group-containing polyethylene copolymer A-11 is used instead of the glycidyl group-containing polyethylene copolymer A-1.

Example 12

A predetermined resin molded article (test sample for evaluation) is obtained in the same condition as Example 1 except that the glycidyl group-containing polyethylene copolymer A-12 is used instead of the glycidyl group-containing polyethylene copolymer A-1.

Comparative Example 1

A predetermined resin molded article (test sample for evaluation) is obtained in the same condition as Example 1 except that the comparative polymer B-1 is used instead of the glycidyl group-containing polyethylene copolymer A-1.

Comparative Example 2

A predetermined resin molded article (test sample for evaluation) is obtained in the same condition as Example 1 except that the comparative polymer B-2 is used instead of the glycidyl group-containing polyethylene copolymer A-1.

Comparative Example 3

A predetermined resin molded article (test sample for evaluation) is obtained in the same condition as Example 1 except that the comparative polymer B-3 is used instead of the glycidyl group-containing polyethylene copolymer A-1.

Comparative Example 4

A predetermined resin molded article (test sample for evaluation) is obtained in the same condition as Example 1 except that the glycidyl group-containing polyethylene copolymer A-1 is not blended.

Test

The following test is performed by using the obtained test samples for evaluation. Compositions of the resin compositions of Examples 1 to 12 (all are presented using parts by weight) are presented in Table 2, and test results below are collectively presented. In addition, compositions of the resin compositions of Comparative Examples 1 to 4 (all are presented using parts by weight), and test results below are collectively presented in Table 3.

Flame Retardance Test

UL-V tests are conducted using UL test samples for V test in UL-94 in conformity with a method regulated in UL-94, to measure a degree of flame retardance of the test samples. Here, degrees of the flame retardance in the UL-94 standard are V-2, V-1, V-0, 5VB, and 5VA in an ascending order of the flame retardance.

Test Method of V-2, V-1, and V-0

Common to the three types above, fire of a gas burner is set on the lower ends of vertically maintained test samples (thickness of 0.8 mm) for 10 seconds. If the burning is stopped within 30 seconds, fire is further set for 10 seconds. In addition, determination criteria conform to the flammability UL-94 standard.

Test Method of 5VB

An operation of setting fire of a gas burner on the lower ends of a vertically maintained test sample (or on the center of the lower surface of the horizontally maintained test sample) (thickness of 1.6 mm) for 5 seconds, and then separating the fire for 5 seconds is repeated 5 times. In addition, determination criteria conform to the flammability UL-94 standard.

Heat Resistance Test

In a state in which a load (1.8 MPa) determined in a test method standard of ASTM D648 is applying to a test samples, a temperature of the test sample for evaluation is increased to measure a temperature when a size of deflection becomes a specific value (deflection temperature under load: DTUL). This is evaluated as a heat resistant temperature.

Tests on Tensile Stress Strength at Yield and Tensile Elongation at Break

Tensile stress strength at yield and tensile elongation at break of the test samples are measured in conformity with JIS K-7113. Further, as a molded article, a test sample (thickness of 4 mm) of JIS1 obtained by injection molding is used. A greater numerical value of tensile stress strength at yield indicates better tensile strength. A greater numerical value of the tensile elongation at break indicates better tensile elongation at break.

Impact Resistance Test

Charpy impact resistance strength (Unit: $kJ/m^2$) is measured by using a product obtained by performing notch process on a ISO multipurpose dumbbell test sample, in conformity with ISO-179, with a digital impact tester (DG-5 manufactured by Toyo Seiki Kogyo Co., Ltd.) in the MD direction, in the condition in which a rising angle is 150°, an energy of the used hammer is 2.0 J, a number of measurement n is 10. A greater value of the Charpy impact resistance strength indicates better impact resistance.

TABLE 2

| Resin composition | Example 1 | Example 2 | Example 3 | Example 4 | Example 5 | Example 6 |
|---|---|---|---|---|---|---|
| Aromatic polycarbonate resin | 75 | 75 | 75 | 75 | 75 | 75 |
| PET resin | 25 | 25 | 25 | 25 | 25 | 25 |
| Polyethylene copolymer A-1 | 5 | | | | | |
| Polyethylene copolymer A-2 | | 5 | | | | |
| Polyethylene copolymer A-3 | | | 5 | | | |
| Polyethylene copolymer A-4 | | | | 5 | | |
| Polyethylene copolymer A-5 | | | | | 5 | |
| Polyethylene copolymer A-6 | | | | | | 5 |
| Polyethylene copolymer A-7 | | | | | | |
| Polyethylene copolymer A-8 | | | | | | |
| Polyethylene copolymer A-9 | | | | | | |

TABLE 2-continued

|  |  |  |  |  |  |  |
|---|---|---|---|---|---|---|
| Polyethylene copolymer A-10 |  |  |  |  |  |  |
| Polyethylene copolymer A-11 |  |  |  |  |  |  |
| Polyethylene copolymer A-12 |  |  |  |  |  |  |
| Stabilized red phosphorus A | 5 | 5 | 5 | 5 | 5 | 5 |
| PTFE | 1 | 1 | 1 | 1 | 1 | 1 |
| Irganox 1076 | 0.3 | 0.3 | 0.3 | 0.3 | 0.3 | 0.3 |
| Evaluation results |  |  |  |  |  |  |
| UL-94 flame retardance V test (thickness: 0.8 mm) | V-0 | V-0 | V-0 | V-0 | V-0 | V-0 |
| UL-94 flame retardance V test (thickness: 1.6 mm) | 5VB | 5VB | 5VB | 5VB | 5VB | 5VB |
| DTUL (1.8 MPa) | 118 | 112 | 114 | 116 | 112 | 113 |
| Tensile stress strength at yield (MPa) | 66 | 65 | 65 | 66 | 65 | 66 |
| Tensile elongation at break (%) | 124 | 110 | 115 | 122 | 108 | 104 |
| Charpy impact strength (kJ/m$^2$) | 42 | 32 | 34 | 38 | 40 | 44 |

|  | Example 7 | Example 8 | Example 9 | Example 10 | Example 11 | Example 12 |
|---|---|---|---|---|---|---|
| Resin composition |  |  |  |  |  |  |
| Aromatic polycarbonate resin | 75 | 75 | 75 | 75 | 75 | 75 |
| PET resin | 25 | 25 | 25 | 25 | 25 | 25 |
| Polyethylene copolymer A-1 |  |  |  |  |  |  |
| Polyethylene copolymer A-2 |  |  |  |  |  |  |
| Polyethylene copolymer A-3 |  |  |  |  |  |  |
| Polyethylene copolymer A-4 |  |  |  |  |  |  |
| Polyethylene copolymer A-5 |  |  |  |  |  |  |
| Polyethylene copolymer A-6 |  |  |  |  |  |  |
| Polyethylene copolymer A-7 | 5 |  |  |  |  |  |
| Polyethylene copolymer A-8 |  | 5 |  |  |  |  |
| Polyethylene copolymer A-9 |  |  | 5 |  |  |  |
| Polyethylene copolymer A-10 |  |  |  | 5 |  |  |
| Polyethylene copolymer A-11 |  |  |  |  | 5 |  |
| Polyethylene copolymer A-12 |  |  |  |  |  | 5 |
| Stabilized red phosphorus A | 5 | 5 | 5 | 5 | 5 | 5 |
| PTFE | 1 | 1 | 1 | 1 | 1 | 1 |
| Irganox 1076 | 0.3 | 0.3 | 0.3 | 0.3 | 0.3 | 0.3 |
| Evaluation results |  |  |  |  |  |  |
| UL-94 flame retardance V test (thickness: 0.8 mm) | V-0 | V-0 | V-0 | V-0 | V-0 | V-0 |
| UL-94 flame retardance V test (thickness: 1.6 mm) | 5VB | 5VB | 5VB | 5VB | 5VB | 5VB |
| DTUL (1.8 MPa) | 107 | 110 | 106 | 107 | 105 | 117 |
| Tensile stress strength at yield (MPa) | 61 | 63 | 60 | 59 | 60 | 67 |
| Tensile elongation at break (%) | 58 | 81 | 119 | 38 | 44 | 138 |
| Charpy impact strength (kJ/m$^2$) | 12 | 15 | 14 | 10 | 10 | 40 |

TABLE 3

|  | Comparative Example 1 | Comparative Example 2 | Comparative Example 3 | Comparative Example 4 |
|---|---|---|---|---|
| Resin composition |  |  |  |  |
| Aromatic polycarbonate resin | 75 | 75 | 75 | 75 |
| PET resin | 25 | 25 | 25 | 25 |
| Comparative polymer B-1 | 5 |  |  |  |
| Comparative polymer B-2 |  | 5 |  |  |
| Comparative polymer B-3 |  |  | 5 |  |
| Stabilized red phosphorus A | 5 | 5 | 5 | 5 |
| PTFE | 1 | 1 | 1 | 1 |
| Irganox 1076 | 0.3 | 0.3 | 0.3 | 0.3 |
| Evaluation results |  |  |  |  |
| UL-94 flame retardance V test (thickness: 0.8 mm) | V-0 | V-0 | V-0 | V-0 |
| UL-94 flame retardance V test (thickness: 1.6 mm) | 5VB | 5VB | 5VB | 5VB |
| DTUL (1.8 MPa) | 105 | 104 | 107 | 108 |
| Tensile stress strength at yield (MPa) | 60 | 59 | 60 | 58 |
| Tensile elongation at break (%) | 4 | 12 | 3 | 2 |
| Charpy impact strength (kJ/m$^2$) | 4 | 8 | 3 | 3 |

As presented in Tables 2 and 3, the resin molded articles of Examples 1 to 12 obtained from the resin composition containing the polycarbonate resin, the aromatic polyester resin, the glycidyl group-containing polyethylene copolymer, and stabilized red phosphorus of which particle surfaces are covered with the thermosetting resin and the inorganic substance, and the volume average particle diameter is 15 μm or less have enhanced impact resistance, enhanced tensile elongation at break, and enhanced heat resistance compared with the resin molded article of Comparative Example 4 obtained from the resin composition containing the polycarbonate resin, the aromatic polyester resin, and the stabilized red phosphorus of which the particle surfaces are covered with the thermosetting resin and the inorganic substance, and the volume average particle diameter is 15 μm or less. In addition, the resin molded articles of Examples 1 to 12 have enhanced impact resistance, enhanced tensile elongation at break, and enhanced heat resistance even compared with the resin molded articles of Comparative Examples 1 to 3 obtained from the resin composition obtained by blending an ethylene polymer not having a glycidyl group.

Among Examples 1 to 12, the resin molded articles of Examples 1, 2, 3, 8, and 9 in which the content of the glycidyl group-containing (meth)acrylic acid ester monomer unit in the glycidyl group-containing polyethylene copolymer is in a range of 2% by weight to 20% by weight and the glass transition temperature is 0° C. or less and the resin molded articles of Example 4, 5, and 6 using a copolymer obtained by graft-polymerizing a vinyl monomer with the main chain of the polyethylene copolymer have more enhanced impact resistance and more enhanced tensile elongation at break compared with the resin molded articles of Examples 7 and 10 in which the content of the glycidyl group-containing (meth) acrylic acid ester monomer unit is less than 2% by weight or greater than 20% by weight (glass transition temperature is 0° C. or less).

Example 13

In Example 13, the resin composition in which the content of the Glycidyl group-containing polyethylene resin is set to be 9% by weight with respect to 100 parts by weight of the total amount of the polycarbonate resin and the aromatic polyester resin is prepared. Specifically, a predetermined resin molded article (test sample for evaluation) is obtained in the same condition as Example 1 except that the content of the glycidyl group-containing polyethylene copolymer A-1 is changed from 5 parts by weight to 9 parts by weight.

Example 14

In Example 14, the resin composition in which the content of the Glycidyl group-containing polyethylene resin is set to be 2% by weight with respect to 100 parts by weight of the total amount of the polycarbonate resin and the aromatic polyester resin is prepared. Specifically, a predetermined resin molded article (test sample for evaluation) is obtained in the same condition as Example 1 except that the content of the glycidyl group-containing polyethylene copolymer A-1 is changed from 5 parts by weight to 2 parts by weight.

Example 15

In Example 15, the resin composition in which the content of the Glycidyl group-containing polyethylene resin is set to be 1% by weight with respect to 100 parts by weight of the total amount of the polycarbonate resin and the aromatic polyester resin is prepared. Specifically, a predetermined resin molded article (test sample for evaluation) is obtained in the same condition as Example 1 except that the content of the glycidyl group-containing polyethylene copolymer A-1 is changed from 5 parts by weight to 1 part by weight.

Example 16

In Example 16, the resin composition in which the content of the Glycidyl group-containing polyethylene resin is set to be 10% by weight with respect to 100 parts by weight of the total amount of the polycarbonate resin and the aromatic polyester resin is prepared. Specifically, a predetermined resin molded article (test sample for evaluation) is obtained in the same condition as Example 1 except that the content of the glycidyl group-containing polyethylene copolymer A-1 is changed from 5 parts by weight to 10 parts by weight.

Example 17

In Example 17, the resin composition in which the content of the Glycidyl group-containing polyethylene resin is set to be 0.5% by weight with respect to 100 parts by weight of the total amount of the polycarbonate resin and the aromatic polyester resin is prepared. Specifically, a predetermined resin molded article (test sample for evaluation) is obtained in the same condition as Example 1 except that the content of the glycidyl group-containing polyethylene copolymer A-1 is changed from 5 parts by weight to 0.5 parts by weight.

Example 18

In Example 18, the resin composition in which the content of the Glycidyl group-containing polyethylene resin is set to be 12% by weight with respect to 100 parts by weight of the total amount of the polycarbonate resin and the aromatic polyester resin is prepared. Specifically, a predetermined resin molded article (test sample for evaluation) is obtained in the same condition as Example 13 except that the content of the glycidyl group-containing polyethylene copolymer A-1 is changed from 5 parts by weight to 12 parts by weight.

Example 19

In Example 19, the resin composition in which the content of the stabilized red phosphorus is set to be 9% by weight with respect to 100 parts by weight of the total amount of the polycarbonate resin and the aromatic polyester resin is prepared. Specifically, a predetermined resin molded article (test sample for evaluation) is obtained in the same condition as Example 1 except that the content of the stabilized red phosphorus A is changed from 5 parts by weight to 9 parts by weight.

Example 20

In Example 20, the resin composition in which the content of the stabilized red phosphorus is set to be 2% by weight with respect to 100 parts by weight of the total amount of the polycarbonate resin and the aromatic polyester resin is prepared. Specifically, a predetermined resin molded article (test sample for evaluation) is obtained in the same condition as Example 1 except that the content of the stabilized red phosphorus A is changed from 5 parts by weight to 2 parts by weight.

Example 21

In Example 21, the resin composition in which the content of the stabilized red phosphorus is set to be 1% by weight with respect to 100 parts by weight of the total amount of the polycarbonate resin and the aromatic polyester resin is prepared. Specifically, a predetermined resin molded article (test sample for evaluation) is obtained in the same condition as Example 1 except that the content of the stabilized red phosphorus A is changed from 5 parts by weight to 1 part by weight.

Example 22

In Example 22, the resin composition in which the content of the stabilized red phosphorus is set to be 10% by weight with respect to 100 parts by weight of the total amount of the polycarbonate resin and the aromatic polyester resin is prepared. Specifically, a predetermined resin molded article (test sample for evaluation) is obtained in the same condition as Example 1 except that the content of the stabilized red phosphorus A is changed from 5 parts by weight to 10 parts by weight.

Example 23

In Example 23, the resin composition in which the content of the stabilized red phosphorus is set to be 1.5% by weight with respect to 100 parts by weight of the total amount of the polycarbonate resin and the aromatic polyester resin is prepared. Specifically, a predetermined resin molded article (test sample for evaluation) is obtained in the same condition as Example 1 except that the content of the stabilized red phosphorus A is changed from 5 parts by weight to 1.5 parts by weight.

Example 24

In Example 24, the resin composition in which the content of the stabilized red phosphorus is set to be 12% by weight with respect to 100 parts by weight of the total amount of the polycarbonate resin and the aromatic polyester resin is prepared. Specifically, a predetermined resin molded article (test sample for evaluation) is obtained in the same condition as Example 1 except that the content of the stabilized red phosphorus A is changed from 5 parts by weight to 12 parts by weight.

Tests are performed in the same manner as in Example 1 by using obtained test samples for evaluation. Compositions of the resin compositions of Examples 13 to 24 (all are presented using parts by weight), and test results above are collectively presented in Table 4.

TABLE 4

| | Example 13 | Example 14 | Example 15 | Example 16 | Example 17 | Example 18 |
|---|---|---|---|---|---|---|
| Resin composition | | | | | | |
| Aromatic polycarbonate resin | 75 | 75 | 75 | 75 | 75 | 75 |
| PET resin | 25 | 25 | 25 | 25 | 25 | 25 |
| Polyethylene copolymer A-1 | 9 | 2 | 1 | 10 | 0.5 | 12 |
| Stabilized red phosphorus A | 5 | 5 | 5 | 5 | 5 | 5 |
| PTFE | 1 | 1 | 1 | 1 | 1 | 1 |
| Irganox 1076 | 0.3 | 0.3 | 0.3 | 0.3 | 0.3 | 0.3 |
| Evaluation results | | | | | | |
| UL-94 flame retardance V test (thickness: 0.8 mm) | V-0 | V-0 | V-0 | V-0 | V-0 | V-0 |
| UL-94 flame retardance V test (thickness: 1.6 mm) | 5VB | 5VB | 5VB | 5VB | 5VB | 5VB |
| DTUL (1.8 MPa) | 115 | 118 | 116 | 114 | 113 | 112 |
| Tensile stress strength at yield (MPa) | 65 | 64 | 62 | 63 | 61 | 61 |
| Tensile elongation at break (%) | 148 | 78 | 33 | 128 | 19 | 101 |
| Charpy impact strength (kJ/m$^2$) | 46 | 20 | 14 | 40 | 9 | 30 |

| | Example 19 | Example 20 | Example 21 | Example 22 | Example 23 | Example 24 |
|---|---|---|---|---|---|---|
| Resin composition | | | | | | |
| Aromatic polycarbonate resin | 75 | 75 | 75 | 75 | 75 | 75 |
| PET resin | 25 | 25 | 25 | 25 | 25 | 25 |
| Polyethylene copolymer A-1 | 5 | 5 | 5 | 5 | 5 | 5 |
| Stabilized red phosphorus A | 9 | 2 | 1 | 10 | 1.5 | 12 |
| PTFE | 1 | 1 | 1 | 1 | 1 | 1 |
| Irganox 1076 | 0.3 | 0.3 | 0.3 | 0.3 | 0.3 | 0.3 |
| Evaluation results | | | | | | |
| UL-94 flame retardance V test (thickness: 0.8 mm) | V-0 | V-0 | V-2 | V-0 | V-1 | V-0 |
| UL-94 flame retardance V test (thickness: 1.6 mm) | 5VB | 5VB | 5VB | 5VB | 5VB | 5VB |
| DTUL (1.8 MPa) | 118 | 117 | 104 | 114 | 106 | 112 |
| Tensile stress strength at yield (MPa) | 66 | 65 | 61 | 64 | 62 | 63 |
| Tensile elongation at break (%) | 85 | 110 | 18 | 70 | 25 | 40 |
| Charpy impact strength (kJ/m$^2$) | 39 | 40 | 11 | 30 | 20 | 15 |

As presented in Table 4, the resin molded articles of Examples 13 to 16 obtained by using the resin composition in which the content of the glycidyl group-containing polyethylene copolymer is in a range of 1% by weight to 10% by weight with respect to 100 parts by weight of the total amount of the polycarbonate resin and the aromatic polyester resin have more enhanced impact resistance and more enhanced tensile elongation at break compared with the resin molded articles of Examples 17 and 18 obtained by using the resin composition in which the content of the glycidyl group-containing polyethylene copolymer is less than 1% by weight, or greater than 10% by weight. In addition, the resin molded articles of Examples 19 to 22 obtained by using the resin composition in which the content of the stabilized red phosphorus is in a range of 1% by weight to 10% by weight with respect to 100 parts by weight of the total amount of the polycarbonate resin and the aromatic polyester resin have more enhanced tensile elongation at break and Charpy strength compared with the resin molded articles of Examples 23 and 24 obtained by using the resin composition in which the content of the stabilized red phosphorus is less than 1% by weight, or greater than 10% by weight.

Example 25

A predetermined resin molded article (test sample for evaluation) is obtained in the same condition as Example 1 except that stabilized red phosphorus B is used instead of the stabilized red phosphorus A. The stabilized red phosphorus B is Nova Red 280A manufactured by Rin Kagaku Kogyo Co., Ltd. Specifically, the stabilized red phosphorus B is stabilized red phosphorus of which the red phosphorus particle surfaces are covered with $Al(OH)_3$ and then are further covered with the phenol resin, and the volume average particle diameter is 15 µm.

Example 26

A predetermined resin molded article (test sample for evaluation) is obtained in the same condition as Example 1 except that stabilized red phosphorus C is used instead of the stabilized red phosphorus A. The stabilized red phosphorus C is EP-15 manufactured by Nippon Chemical Industrial Co., Ltd. Specifically, the stabilized red phosphorus C is stabilized red phosphorus of which the red phosphorus particle surfaces are covered with an epoxy resin, and the volume average particle diameter is 15 µm.

Example 27

A predetermined resin molded article (test sample for evaluation) is obtained in the same condition as Example 1 except that stabilized red phosphorus D is used instead of the stabilized red phosphorus A. The stabilized red phosphorus D is CP-A15 manufactured by Nippon Chemical Industrial Co., Ltd. Specifically, the stabilized red phosphorus D is stabilized red phosphorus of which the red phosphorus particle surfaces are covered with aluminum hydroxide, and the volume average particle diameter is 15 µm.

Example 28

A predetermined resin molded article (test sample for evaluation) is obtained in the same condition as Example 1 except that 70 parts by weight of a bisphenol A-type polycarbonate resin (Product name: "L1225L" manufactured by Teijin Limited, viscosity average molecular weight: 22,000), 20 parts by weight of a polyethylene terephthalate resin (Product name: "J125" manufactured by Mitsui Chemicals, Inc., IV value: 0.77 dl/g), 10 parts by weight of an acrylonitrile-butadiene-styrene copolymer (ABS resin, Product name: "Toyolac 700" manufactured by Toray Industries, Inc.), 5 parts by weight of the glycidyl group-containing polyethylene copolymer A-1, 5 parts by weight of the stabilized red phosphorus A, 1 part by weight of polytetrafluoroethylene (Product name: "A-3800" manufactured by Mitsubishi Rayon Co., Ltd., PTFE content: 50%), and 0.3 parts by weight of a phenol resin (Product name: "Irganox1076" manufactured by BASF SE) are mixed.

Example 29

A predetermined resin molded article (test sample for evaluation) is obtained in the same condition as Example 1 except that the content of the bisphenol A-type polycarbonate resin is changed from 75 parts by weight to 50 parts by weight, and the content of the polyethylene terephthalate resin is changed from 25 parts by weight to 50 parts by weight.

Example 30

A predetermined resin molded article (test sample for evaluation) is obtained in the same condition as Example 1 except that the content of the bisphenol A-type polycarbonate resin is changed from 75 parts by weight to 90 parts by weight, and the content of the polyethylene terephthalate resin is changed from 25 parts by weight to 10 parts by weight.

Example 31

A predetermined resin molded article (test sample for evaluation) is obtained in the same condition as Example 1 except that the polyethylene terephthalate resin is changed to a PBT resin (Product name: "5020" manufactured by Mitsubishi Engineering-Plastics Corporation).

Comparative Example 5

A predetermined resin molded article (test sample for evaluation) is obtained in the same condition as Example 1 except that comparative stabilized red phosphorus F is used instead of the stabilized red phosphorus A. The comparative stabilized red phosphorus F is TP-10 manufactured by Nippon Chemical Industrial Co., Ltd. Specifically, the comparative stabilized red phosphorus F is stabilized red phosphorus of which red phosphorus particle surfaces are covered with titanium oxide (proportion of red phosphorus: 90%), and the volume average particle diameter is 20 µm.

Comparative Example 6

A predetermined resin molded article (test sample for evaluation) is obtained in the same condition as Example 1 except that comparative stabilized red phosphorus G is used instead of the stabilized red phosphorus A. The comparative stabilized red phosphorus G is Nova Excel 140 manufactured by Rin Kagaku Kogyo Co., Ltd. Specifically, the comparative stabilized red phosphorus G is stabilized red phosphorus of which red phosphorus particle surfaces are covered with $Al(OH)_3$ and then are further covered with the phenol resin (proportion of red phosphorus: 92%), and the volume average particle diameter is 30 µm.

Comparative Example 7

A predetermined resin molded article (test sample for evaluation) is obtained in the same condition as Example 1 except that red phosphorus of which particle surfaces are not covered with a resin or the like is used instead of the stabilized red phosphorus A. The red phosphorus is high purity red phosphorus manufactured by Rasa Industries Ltd. The volume average particle diameter of red phosphorus is 30 μm.

Tests are performed in the same manner as in Example 1 by using obtained test samples for evaluation. Compositions of the resin compositions of Examples 25 to 31 (all are presented using parts by weight), and test results are collectively presented in Table 5. Compositions of the resin compositions of Comparative Examples 5 to 7 (all are presented using parts by weight), and test results are collectively presented in Table 6.

As presented in Tables 5 and 6, the resin molded articles of Examples 25 to 31 in which the volume average particle diameter of the stabilized red phosphorus is 15 μm or less have enhanced impact resistance and enhanced tensile elongation at break compared with the resin molded articles of Comparative Examples 5 and 6 in which the volume average particle diameter of the stabilized red phosphorus is greater than 15 μm or compared with the resin molded article of Comparative Example 7 obtained by using red phosphorus in which a coating treatment with a thermosetting resin or an inorganic substance is not performed. The resin molded article of Example 25 obtained by using stabilized red phosphorus of which red phosphorus particle surfaces are covered with an inorganic substance $(Al(OH)_3)$ and then are further covered with a thermosetting resin (phenol resin) in Examples 25 to 31 has more enhanced tensile elongation at

TABLE 5

|  | Example 25 | Example 26 | Example 27 | Example 28 | Example 29 | Example 30 | Example 31 |
|---|---|---|---|---|---|---|---|
| Resin composition | | | | | | | |
| Aromatic polycarbonate resin | 75 | 75 | 75 | 75 | 50 | 90 | 75 |
| PET resin | 25 | 25 | 25 | 20 | 50 | 10 | |
| PBT resin | | | | | | | 25 |
| Polyethylene copolymer A-1 | 5 | 5 | 5 | 10 | 5 | 5 | 5 |
| ABS resin | | | | 5 | | | |
| Stabilized red phosphorus A | | | | 5 | 5 | 5 | 5 |
| Stabilized red phosphorus B | 5 | | | | | | |
| Stabilized red phosphorus C | | 5 | | | | | |
| Stabilized red phosphorus D | | | 5 | | | | |
| PTFE | 1 | 1 | 1 | 1 | 1 | 1 | 1 |
| Irganox 1076 | 0.3 | 0.3 | 0.3 | 0.3 | 0.3 | 0.3 | 0.3 |
| Evaluation results | | | | | | | |
| UL-94 flame retardance V test (thickness: 0.8 mm) | V-0 | V-0 | V-0 | V-0 | V-0 | V-0 | V-0 |
| UL-94 flame retardance V test (thickness: 1.6 mm) | 5VB | 5VB | 5VB | 5VB | 5VB | 5VB | 5VB |
| DTUL (1.8 MPa) | 114 | 111 | 111 | 116 | 100 | 120 | 124 |
| Tensile stress strength at yield (MPa) | 65 | 64 | 64 | 68 | 68 | 64 | 70 |
| Tensile elongation at break (%) | 83 | 36 | 28 | 138 | 103 | 97 | 116 |
| Charpy impact strength $(kJ/m^2)$ | 28 | 14 | 13 | 48 | 18 | 46 | 48 |

TABLE 6

|  | Comparative Example 5 | Comparative Example 6 | Comparative Example 7 |
|---|---|---|---|
| Resin composition | | | |
| Aromatic polycarbonate resin | 75 | 75 | 75 |
| PET resin | 25 | 25 | 25 |
| Polyethylene copolymer A-1 | 5 | 5 | 5 |
| Comparative stabilized red phosphorus F | 5 | | |
| Comparative stabilized red phosphorus G | | 5 | |
| Red phosphorus | | | 5 |
| PTFE | 1 | 1 | 1 |
| Irganox 1076 | 0.3 | 0.3 | 0.3 |
| Evaluation results | | | |
| UL-94 flame retardance V test (thickness: 0.8 mm) | V-0 | V-0 | V-0 |
| UL-94 flame retardance V test (thickness: 1.6 mm) | 5VB | 5VB | 5VB |
| DTUL (1.8 MPa) | 110 | 110 | 111 |
| Tensile stress strength at yield (MPa) | 64 | 64 | 63 |
| Tensile elongation at break (%) | 21 | 14 | 4 |
| Charpy impact strength $(kJ/m^2)$ | 9 | 7 | 3 | break and more enhanced Charpy impact strength compared with the resin molded articles of Examples 26 and 27 obtained by using stabilized red phosphorus of which red phosphorus particle surfaces are covered with an inorganic substance (aluminum hydroxide) or stabilized red phosphorus of which red phosphorus particle surfaces are covered with a thermosetting resin (epoxy resin).

In addition, the resin molded article of Example 28 obtained from the resin composition obtained by blending an ABS resin with a composition containing a polycarbonate resin, an aromatic polyester resin, a glycidyl group-containing polyethylene copolymer, and stabilized red phosphorus of which particle surfaces are covered with a thermosetting resin and an inorganic substance, and the volume average particle diameter is 15 μm or less has more enhanced impact resistance and more enhanced tensile elongation at break compared with the resin molded article of Example 1 obtained from resin composition in which the ABS resin is not blended. It is considered that this is because the ABS resin functions as a thermoplastic elastomer. In addition, also in the resin molded articles of Examples 29 and 30 in which the composition ratio of the polycarbonate resin and the aromatic polyester resin are changed and the resin molded article of Example 31 in which the kind of the aromatic polyester resin is changed, impact resistance and tensile elongation at break are enhanced compared with the resin molded article of Comparative Example obtained from the resin composition containing the polycarbonate resin, the aromatic polyester resin, and the stabilized red phosphorus A.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A resin composition comprising:
   a polycarbonate resin, wherein the content of the polycarbonate resin in the resin composition is in a range of 50% by weight to 95% by weight of the resin composition;
   an aromatic polyester resin;
   a glycidyl group-containing ethylene copolymer; and
   stabilized red phosphorus comprised of red phosphorus particles the surfaces of which are covered with a thermosetting resin, an inorganic substance, or both a thermosetting resin and an inorganic substance, the volume average particle diameter of the stabilized red phosphorus being 15 μm or less.

2. The resin composition according to claim 1,
   wherein the content of the glycidyl group-containing ethylene copolymer is in a range of 1% by weight to 10% by weight with respect to 100 parts by weight of the total amount of the polycarbonate resin and the aromatic polyester resin.

3. The resin composition according to claim 2,
   wherein the content of the stabilized red phosphorus is in a range of 1% by weight to 10% by weight with respect to 100 parts by weight of the total amount of the polycarbonate resin and the aromatic polyester resin.

4. The resin composition according to claim 3,
   wherein the glycidyl group-containing ethylene copolymer is an ethylene copolymer composed of a glycidyl group-containing (meth)acrylic acid ester monomer unit and an ethylene monomer unit, wherein the content of the glycidyl group-containing (meth)acrylic acid ester monomer unit in the glycidyl group-containing ethylene copolymer is in a range of 2% by weight to 20% by weight, and of which a glass transition temperature is 0° C. or less, or a copolymer obtained by graft-polymerizing a vinyl monomer with a main chain of the ethylene copolymer composed of a glycidyl group-containing (meth)acrylic acid ester monomer unit and an ethylene monomer unit.

5. The resin composition according to claim 2,
   wherein the glycidyl group-containing ethylene copolymer is an ethylene copolymer composed of a glycidyl group-containing (meth)acrylic acid ester monomer unit and an ethylene monomer unit, wherein the content of the glycidyl group-containing (meth)acrylic acid ester monomer unit in the glycidyl group-containing ethylene copolymer is in a range of 2% by weight to 20% by weight, and of which a glass transition temperature is 0° C. or less, or a copolymer obtained by graft-polymerizing a vinyl monomer with a main chain of the ethylene copolymer composed of a glycidyl group-containing (meth)acrylic acid ester monomer unit and an ethylene monomer unit.

6. A resin molded article comprising the resin composition according to claim 2.

7. The resin composition according to claim 1,
   wherein the content of the stabilized red phosphorus is in a range of 1% by weight to 10% by weight with respect to 100 parts by weight of the total amount of the polycarbonate resin and the aromatic polyester resin.

8. The resin composition according to claim 7,
   wherein the glycidyl group-containing ethylene copolymer is an ethylene copolymer composed of a glycidyl group-containing (meth)acrylic acid ester monomer unit and an ethylene monomer unit, wherein the content of the glycidyl group-containing (meth)acrylic acid ester monomer unit in the glycidyl group-containing ethylene copolymer is in a range of 2% by weight to 20% by weight, and of which a glass transition temperature is 0° C. or less, or a copolymer obtained by graft-polymerizing a vinyl monomer with a main chain of the ethylene copolymer composed of a glycidyl group-containing (meth)acrylic acid ester monomer unit and an ethylene monomer unit.

9. The resin composition according to claim 1,
   wherein the glycidyl group-containing ethylene copolymer is an ethylene copolymer composed of a glycidyl group-containing (meth)acrylic acid ester monomer unit and an ethylene monomer unit, wherein the content of the glycidyl group-containing (meth)acrylic acid ester monomer unit in the glycidyl group-containing ethylene copolymer is in a range of 2% by weight to 20% by weight, and of which a glass transition temperature is 0° C. or less, or a copolymer obtained by graft-polymerizing a vinyl monomer with a main chain of the ethylene copolymer composed of a glycidyl group-containing (meth)acrylic acid ester monomer unit and an ethylene monomer unit.

10. A resin molded article comprising the resin composition according to claim 1.

11. The resin composition according to claim 1,
    wherein the polycarbonate resin is an aromatic polycarbonate resin.

* * * * *